UNITED STATES PATENT OFFICE.

SHEBNAH RICH, OF BOSTON, ASSIGNOR TO WILLIAM W. TREAT, OF WATERTOWN, MASSACHUSETTS.

IMPROVEMENT IN PRESERVING TOGETHER CURED FISH AND POTATOES.

Specification forming part of Letters Patent No. 201,834, dated March 26, 1878; application filed November 23, 1876.

*To all whom it may concern:*

Be it known that I, SHEBNAH RICH, of Boston, in the county of Suffolk and State of Massachusetts, have invented a Method of Preserving Cured Fish and Potatoes Together as a permanent article of food and commerce, of which the following is a specification:

The art of preserving fish, meats, eggs, vegetables, fruits, and other commodities is not broadly new, but has been long practiced, and has been constantly changing, advancing, and improving, and being extended in its applications through the study and experiments of inventors; but the qualities of different substances, particularly of substances adapted to form articles of food, are so various, and subject, respectively, to such delicate and subtle influences and conditions with regard to flavor and odor, as yet really but little understood, that a process well adapted to treat one substance is found not only useless and impracticable, but frequently deleterious, when applied to other substances even of the same generic class. Therefore, notwithstanding the numerous preservative processes that have heretofore been practiced with respect to various other articles of food, no one of them, previous to my discovery, has been adapted to the perfect preservation of the favorite food commodity of cod-fish and vegetable hash.

It is well known that cured cod-fish forms an important article of diet in cold countries; but there is no known and successful process for long keeping it under varying conditions of temperature and of humidity of the atmosphere, and it is a very perishable article, becoming dry, hard, crumbled, tasteless, void of nutriment, and in a measure decayed, under some conditions, and soft, putrid, and offensive in smell under others. Potatoes are also very perishable, and in long voyages at sea, where a cheap fish and vegetable hash is most important as an anti-scorbutic, it cannot be had; hence the great utility of my invention, which has for its object the permanent preservation of the nutritive and agreeable-flavored fish-and-potato hash, that is commonly used in families, in tin cans and other suitable packages, so that it will keep good and palatable for months or years, and so that it may be conveniently transported long distances by land and by sea, and into hot climates. This healthful and nutritious mixture of fish and vegetables, as it is ordinarily made in the kitchen, spoils quickly, and becomes offensive, even when it is hermetically sealed up out of contact with the atmosphere; and previous to my discovery it had never been successfully preserved and sold as an article of commerce.

I have found that it may be effectually preserved, as a most valuable commodity of food, by melting and cooking the fish and vegetable hash with beef-tallow, with the addition of some saltpeter, in hermetically-sealed tin cans, substantially as specified below; and, to enable persons skilled in the art to practice my invention, I will give one mode of procedure, which I prefer, as follows: Take four pounds of sound cured cod-fish, (George's fish preferred,) and thoroughly cleanse it from adhering salt and impurities by soaking and washing in tepid water, instead of parboiling, as is the usual process when preparing it for the table, and then reduce it to the form of pulp by any suitable means; take five pounds of good potatoes, boil them until they are well cooked, then remove the skins and mash them; take about half a pound of raw onions and chop them fine; take at least half a pound of pure "tried-out" beef-tallow. Now put these four ingredients together, warm them, and mix them thoroughly, adding during the mixing not more than a quarter of a pound of saltpeter and a quarter of an ounce of red or black pepper, mustard, or suitable condiments to flavor the mixture and make it palatable. While this mixture is warm, fill the tin cans or other suitable packages with it, and hermetically seal them. Then boil these sealed packages for about three hours in a solution-bath of salt and water at a temperature above 212° Fahrenheit, in the manner commonly known to packers of preserved food, and, after cooling, their contents are preserved.

In this process the melting fat and the small proportion of saltpeter are essential ingredients, and my invention is based upon compounding and melting them with the fish and potatoes together in closed vessels; but I do not intend to limit my invention to the exact proportions of the formula given above, nor to the use of any particular kind of fat that may be adapted to serve my purpose successfully, and other vegetables—such as beets or turnips—may be used with or in place of part of the potatoes.

What I claim is—

The process herein described of permanently preserving cured fish and potatoes together, as a commercial article of food for all climates, consisting in first washing the fish in tepid water and cleansing it of superfluous salt and other impurities, then reducing it to pulp, then mixing it with cooked hashed potatoes and raw chopped onions, tallow, condiments, and saltpeter, in substantially the proportions specified, and then, while warm, sealing the compound hermetically in cans and boiling, as described.

SHEBNAH RICH.

Witnesses:
  F. HUTCHINSON,
  WILLIAM H. PREBLE.